United States Patent [19]

Buelens et al.

[11] Patent Number: 5,354,009
[45] Date of Patent: Oct. 11, 1994

[54] RELOADABLE LIGHTTIGHT PLASTIC CASSETTE

[75] Inventors: Edward Buelens, Kontich; Lieven Dirx, Oud-Turnhout, both of Belgium

[73] Assignee: Gevaert-Agfa N.V., Mortsel, Belgium

[21] Appl. No.: 28,361

[22] Filed: Mar. 10, 1993

[30] Foreign Application Priority Data

Mar. 19, 1992 [EP] European Pat. Off. ........ 92200791.9

[51] Int. Cl.$^5$ .................... B65H 16/06; G03B 1/02; G03B 17/26
[52] U.S. Cl. .................................................. 242/348.4
[58] Field of Search .................... 242/71, 71.1, 55.53, 242/71.7; 354/275, 277; 355/72, 73, 74

[56] References Cited

U.S. PATENT DOCUMENTS

| | | | |
|---|---|---|---|
| 3,104,846 | 9/1963 | Ringle | 242/71.1 X |
| 3,627,225 | 12/1971 | Badum et al. | 242/197 X |
| 3,631,971 | 1/1972 | Rinkleib | 242/197 X |
| 3,771,687 | 11/1973 | Krtous | 242/71.1 X |
| 4,002,238 | 1/1977 | Cameron et al. | 242/71.1 X |
| 4,148,395 | 4/1979 | Syracuse et al. | 354/275 |
| 4,239,164 | 12/1980 | Barnsbee et al. | 242/71.7 X |
| 4,272,035 | 6/1981 | Sherman et al. | 242/71.7 X |
| 4,291,802 | 9/1981 | Buelens | 242/71.7 X |
| 4,302,102 | 11/1981 | Stark et al. | 355/72 |
| 4,420,120 | 12/1983 | Raymond | 242/71.7 |
| 4,431,139 | 2/1984 | Barnsbee et al. | 242/71.7 X |
| 4,732,271 | 3/1988 | Solyntjes | 242/71.7 X |
| 4,733,777 | 3/1988 | Van Geyte et al. | 242/71.7 |
| 4,741,439 | 5/1988 | Bizic | 242/71.7 X |
| 4,754,875 | 7/1988 | Rauffer et al. | 242/55.53 X |
| 4,787,513 | 11/1988 | Auble et al. | 242/71.7 X |
| 4,842,211 | 6/1989 | Robbins | 242/71.7 X |
| 4,889,292 | 12/1989 | Loewe et al. | 206/409 X |
| 4,911,299 | 3/1990 | Peeters | 206/410 |
| 4,956,908 | 9/1990 | Morse et al. | 242/71.1 X |
| 4,988,054 | 1/1991 | Morse et al. | 242/71.7 |
| 5,046,677 | 9/1991 | Loewe et al. | 242/55.53 X |
| 5,053,795 | 10/1991 | Wyman | 242/71.1 X |
| 5,126,774 | 6/1992 | Loewe et al. | 354/275 |
| 5,193,759 | 3/1993 | Bigelow et al. | 354/275 X |

FOREIGN PATENT DOCUMENTS 0125674 11/1984 European Pat. Off. ............. 355/72
0325308 7/1989 European Pat. Off. .

OTHER PUBLICATIONS

"The Way Things Work", vol. 2, Simon and Schuster, 1971, pp. 428–429.

Primary Examiner—Daniel P. Stodola
Assistant Examiner—John P. Darling
Attorney, Agent, or Firm—William J. Daniel

[57] ABSTRACT

A daylight reloadable lighttight plastic cassette for holding and dispensing a roll of light sensitive material is formed of a hollow open-ended tubular housing having lighttightly mating hingedly connected base and lid sections which pivot apart on the hinge to open the housing, A dispensing slot lighttightly sealed, e.g. by plush fabric, is present on the housing side opposite the hinge, preferably defined between suitably spaced longitudinal edges of the housing sections. The opposite housing ends are lighttightly closed by end caps, each molded in two mating sections, which are telescopingly fitted on end margins of the housing sections. The end cap sections can be carried by the respective housing sections to pivot therewith in clam-shell fashion. The housing sections can be latched in closed position, preferably with latches engaging the end cap sections. Alternatively, the end cap sections for each end cap can be hinged together with one section anchored on a housing section while the other cap section is flippable on the hinge laterally of the end cap to free the other housing section for opening the housing.

16 Claims, 12 Drawing Sheets

RELOADABLE LIGHTTIGHT PLASTIC CASSETTE

BACKGROUND OF THE INVENTION

1. Field of the Invention

The present invention relates in general to a reloadable lighttight plastic cassette for holding a roll of light-sensitive web material and for dispensing the web through a lighttight dispenser slot, and in particular to a cassette which is reloadable in daylight with a lighttightly packaged roll of light-sensitive material, and which is almost universally usable in existing apparatus that operate with so-called dedicated cassettes.

The invention also aims to provide a cassette that is made of plastics that are ecologically more interesting than PVC-type plastics, that up to now have and are being used on a large scale for the manufacture of the housing and/or side caps of suchlike cassettes.

2. Description of the Prior Art

Reloadable lighttight cassettes for holding a roll of light-sensitive web material and dispensing it through a lighttight slot are known, in particular in the field of phototypesetting. These cassettes are reloaded by the operator in the darkroom with a fresh roll of light-sensitive film or paper which is supplied by the manufacturer in a suitable lighttight wrapper and can then be placed in daylight in a phototypesetter apparatus where only the leader of the roll that serves for the engagement of the film by the transport rollers of the apparatus becomes exposed to actinic light before the apparatus is lighttightly closed.

The mentioned cassettes are dedicated or machine-type cassettes and are solid constructions usually made by injection-moulding of light metal, such as aluminium, or of high-grade plastics such as high impact polystyrene or ABS, and they form so to say part of the apparatus.

Since a phototypesetter apparatus usually operates with different widths and different types of light-sensitive material, it is clear that several cassettes have to be provided for each apparatus what raises the costprice of the installation.

The photographic industry has succeeded in avoiding the use of a darkroom by providing lighttightly packaged rolls of light-sensitive material in cheap disposable cassettes. These cassettes are made of cardboard, cheap plastic or a combination of both and have outer dimensions that are compatible with those of the original dedicated cassettes so that they can replace these cassettes on an almost universal scale.

Environmental considerations are putting an ever growing strain on the use of these disposable cassettes because they contain simple or composite materials that are difficult to destroy or recycle, such as cardboard laminated via complex adhesives with aluminium foil, plastic parts in PVC, metal staples, etc., so that the photographic industry is now promoting the use of lighttightly packaged rolls of light-sensitive material suitable for daylight loading. Thus, the fresh rolls of photographic material are wrapped by their manufacture in such a way that they still fit in the original dedicated cassettes, while leaving a leader projecting from the dispenser slot of the cassette. This leader allows withdrawal by hand of the lighttight wrapper of the filmroll from the cassette and next pulling the leading end of the film through the dispensing slot of the cassette so that the latter can be introduced in a usual way in the phototypesetting apparatus.

A cassette which bears some analogy with the cassette according to the present invention is disclosed in U.S. Pat. No. 5,053,597. This cassette too is made entirely of plastics and comprises a housing with two parts hingedly connected together. It has, however, the disadvantages that it is made by injection moulding so that each film roll format requires a separate mould, and that the hinge is composed of a plurality of distinct sub-elements causing a further increase of the costprice of the mould.

Another plastics cassette is disclosed in EP-A1-0 325 308. The housing of the cassette is made by extrusion moulding and has an integral hinge from an elastic material, co-extruded with the rest of the housing. The side caps or end covers are permanently fitted to the cassette by the manufacturer of the photographic material once the cassette has been loaded with a roll of film. The described cassettes are not reloadable and are thus in conflict with nowadays environmental insights.

SUMMARY OF THE INVENTION

Objects of the Invention

It is an object of the present invention to provide a reusable cassette for the daylight loading of photographic material, which offers all the advantages of the usual dedicated cassettes but which is cheap to manufacture and easy to handle, and can be used on an almost universal scale for any different formats and types of photographic material currently in use.

It is a further object of the invention to provide suchlike cassette that readily lends itself to ecological disposal and economical recycling after a number of reloadings that will be smaller than that of the known dedicated cassettes but that, considering the low costprice of the cassette, economically justifies its use.

Statement of the Invention

In accordance with the present invention, a reloadable lighttight plastic cassette for holding a roll of light-sensitive web and dispensing it through a lighttight dispenser slot comprises a housing with a substantially uniform cross-section and two side caps co-operating with the corresponding lateral side edges of the housing in a lighttight manner, the housing being made of plastics by extrusion moulding and having a hinge opposite the dispenser slot defining a base and a lid section of the housing and allowing opening of the housing to be loaded with a fresh roll of light-sensitive web, the hinge being made of resilient plastic co-extruded with the housing, the side caps being moulded components each of which comprises two sections co-operating with a corresponding section of the housing, one section at least of each side cap being fixedly attached to a corresponding section of the housing, and each side cap having locking means for keeping the loaded cassette closed.

The inventive cassette is made completely of plastics so that a cheap costprice can be coupled to an attractive appearance.

The manufacture of the housing by extrusion-moulding has the advantage that housings for different film widths can be cut from one extruded element. For instance, an extruded element measuring 96×96 mm as outer dimensions, can be cut in lengths of 116, 217 and 319 mm to make cassettes for standard film widths of 4, 8 and 12 inches.

The side caps can be attached to the side edges of the housing in any known way such as by adhesive bonding, by ultrasonic welding, etc.

It is clear that a cassette in accordance with the present invention does not offer the easy-doing feature of actual disposable cassettes loaded already by their manufacturer, so that the user is obliged to reload each cassette as he used to do with the original dedicated cassettes. However, the inventive cassette allows to considerably reduce the loss of valuable material caused by disposal, and this at a cost price for each cassette which is neglectable as compared with that of known dedicated cassettes.

A roll of photographic material can be simply laid in the cassette for free rotation, but it is clear that in view of a gentle treatment of the photographic material it is preferred to suspend the roll for free rotation around a core in the cassette. To that end, two removable supporting flanges with central hubs can be placed in the open core ends of a lighttightly wrapped roll of material whereafter the roll, together with the flanges, is placed in the cassette.

According to one embodiment of the invention, the two sections of each side cap are separate parts having overlapping lip means forming a labyrinth-like lighttight closure for a closed side cap, and each are fixedly attached to a corresponding section of the housing.

This has the advantage that the cassette is virtually divided in two integral parts that can swing about the hinge of the housing. The free ends of the opened sections of the housing may constitute the corresponding lips of the dispenser slot.

The hinge of the housing can in principle be located at any height of the wall of the housing in which it is formed, provided the section of the cassette that functions as lid opens sufficiently wide to allow the unhindered loading of a fresh roll in the section of the cassette that functions as a base.

The position of the hinge can be halfway the height of the wall into which it is formed. This has the advantage that if the cassette lid is opened over 180 degrees, the top and the bottom wall of the cassette lie in one plane so that the cassette can take a very stable position on the desk onto which it is placed for being loaded. However, the hinge of the cassette can also be placed lower, i.e. more towards the bottom wall of the base section of the cassette, so that opening of the lid yields a wider space for the cassette to being loaded, such as in the case of film rolls in a daylight-loading wrapping having wrapping flange portions the diameter of which is larger than that of the film roll (see e.g. U.S. Pat. No. 4,911,299 mentioned hereinbefore), or rolls being rotatably supported in flanges, which have a shape that can hamper their smooth introduction in the cassette.

In usual phototypesetting cassettes, the dispenser slot for the film is located in one wall of the housing at a small distance—of the order of magnitude of 10 mm—remote from the adjacent wall. It is advantageous that in a cassette according to the invention suchlike dispenser slot be located in the upper half of a cassette which is put on a desk for unloading resp. loading, so that the lower cassette half that rests on the desk has a larger volume than the upper half whereby a more stable position is obtained. The cassette half with the correspondingly smaller volume serves in that case as a lid for the cassette.

In order to provide sufficient finger room for gripping the flanges between which a roll of film is rotatably supported in the cassette, it is advantageous that the two sections of each end cap do not join each other according to a straight line that runs almost straight from the hinge to the dispenser slot, but rather that such joining occurs according to a curved line that in the base section of the cassette has a concave curvature co-axial with the longitudinal centre line of the cassette.

According to another embodiment of a cassette according to the invention, the two sections of each side cap are relatively swingable in a plane normal to that of the cap, an integral hinge interconnecting both sections running from one lateral side of the cap to the opposite one and being normal thereto, and one section only of each side cap being fixedly attached to a corresponding section of the housing.

In this case, the two movable parts of the side caps must first be swung away from the housing before the latter can be opened about its hinge. The advantage of this embodiment is that both parts of each end cap can be interconnected through an integral hinge that has a substantial length whereby a strong connection between both parts is obtained. Further, the position of the hinge of the housing must in this case not necessarily coincide with that of the hinge of the end caps.

BRIEF DESCRIPTION OF THE INVENTION

The invention will be described hereinafter by way of example with reference to the accompanying drawings, wherein.

Figure 1:
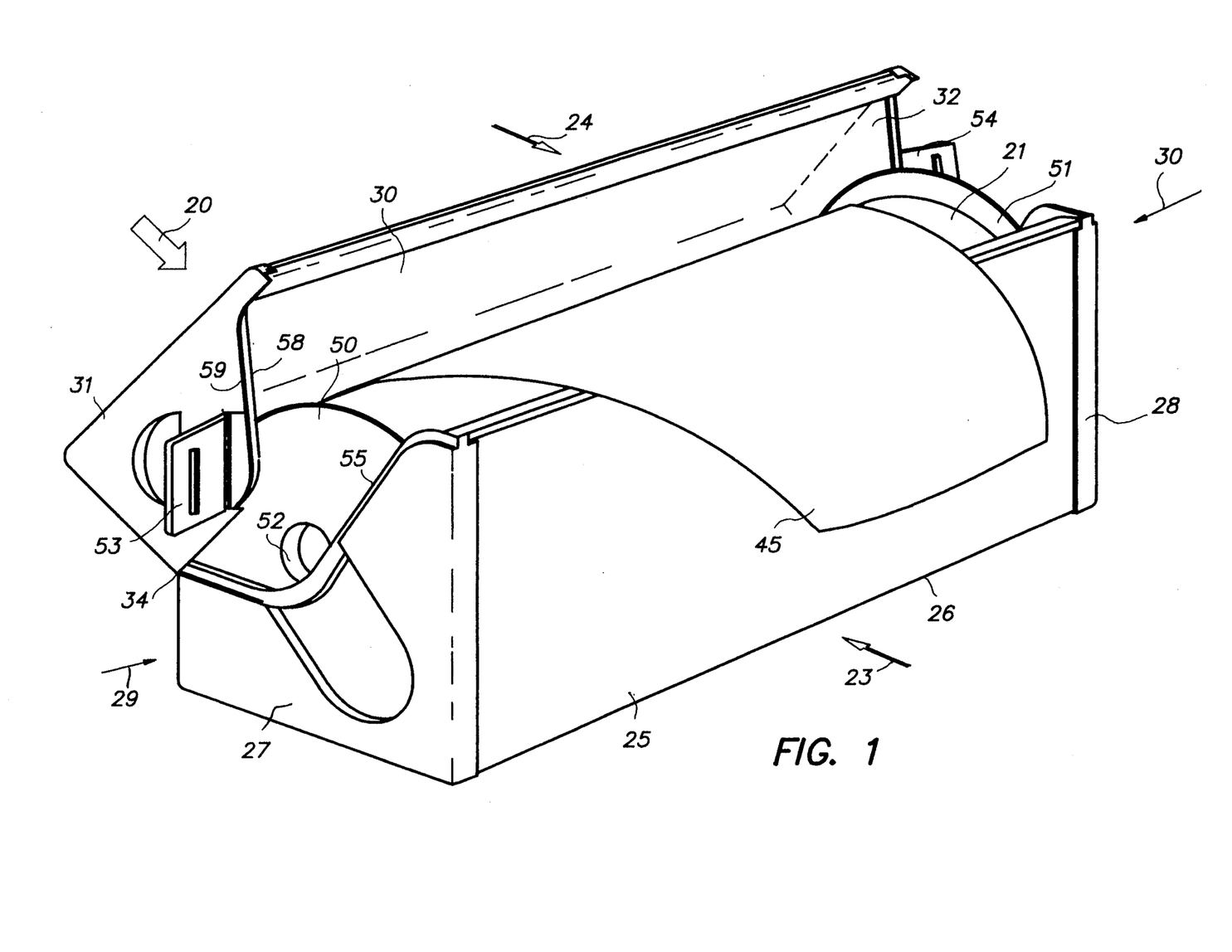
FIG. 1 is a perspective view of one embodiment of a cassette according to the invention, shown partly opened.

FIG. 1 illustrates one embodiment of a lighttight reloadable cassette 20 according to the invention, for enclosing and dispensing a roll 21 of photographic film. The cassette has been shown partly opened and comprises a lower section or base 23 and an upper section or lid 24. The base is constituted by one section 25 of the housing 26 (see also FIG. 2 which is reversed over 180° with respect to FIG. 1), and the lower sections 27 and 28 of the side caps 29 and 30, that are fixedly attached to the lateral side or end edges of housing section 25. Lid 24 is constituted by the other section 30 of housing 26 and the upper sections 31 and 32 of the side caps that are fixedly attached to the corresponding side edges of said housing section.

Housing 26 has been made by extrusion-moulding, and a hinge 34 has been integrally moulded by known co-extrusion techniques to hingedly connect sections 25 and 30 of the housing with each other.

In the present example, very good results have been obtained by using for the housing and the side caps a black pigmented mixture of 85% of POLYSTYROL (registered trademark of BASF, Germany) PS466I, which is a high-impact polystyrene suited for injection- as well as for extrusion-moulding, and 15% of STYROLUX KR 2686 (registered trademark of BASF), which is a styrene/butadiene blockcopolymer. The locks were made from red pigmented polypropylene. The hinge was co-extruded from black pigmented LOTRYL Grade 30 BA 02 (registered trademark of ATOCHEM (Elf Aquitaine), which is an ethylene/acrylic ester copolymer.

Figure 4:
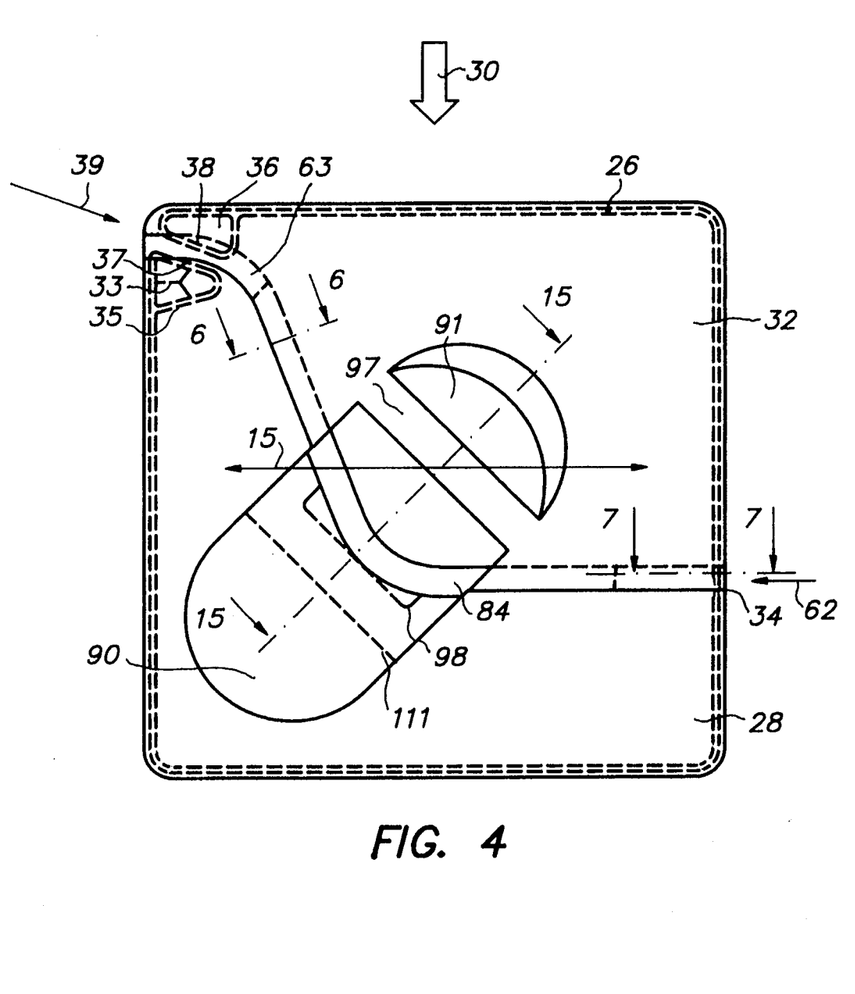
FIG. 4 is a front elevation of one side or end cap of the cassette of FIG. 1 in closed position.

In the closed position of the housing, its cross-section is nearly square with the free ends of both sections ending in triangular beams 35 and 36 which provide opposed lips 37 and 38 defining dispenser slot 39 (see FIG. 4). Strips of velvet 40 and 41 (see FIG. 2), are adhered to said lips and co-operate to ensure the lighttightness of the slot. A Y-shaped projection 33 on the inner side surface of each side cap fits into the corresponding open end of beam 35.

Figure 2:
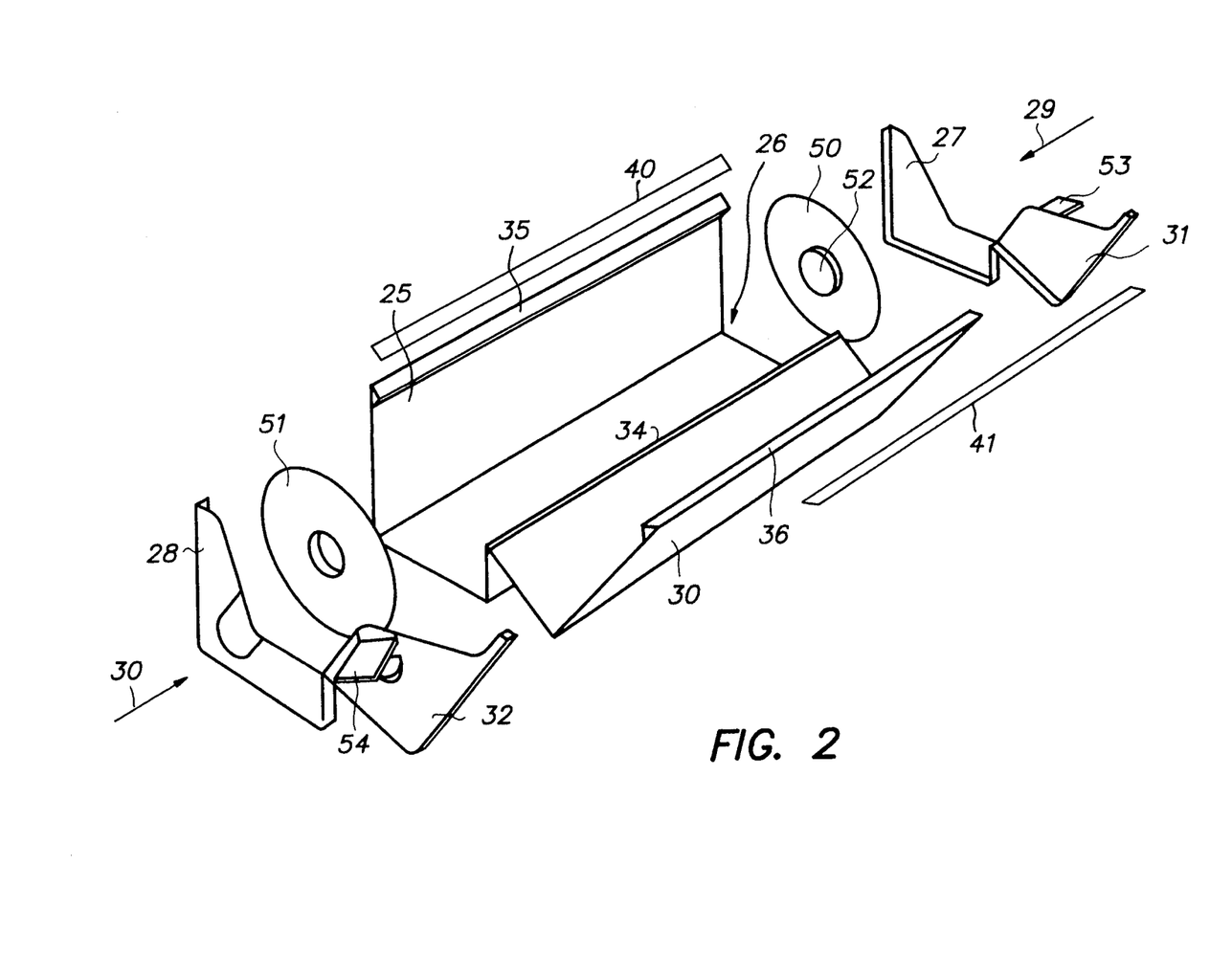
FIG. 2 is an exploded view of the cassette of FIG. 1.
Figure 3A:
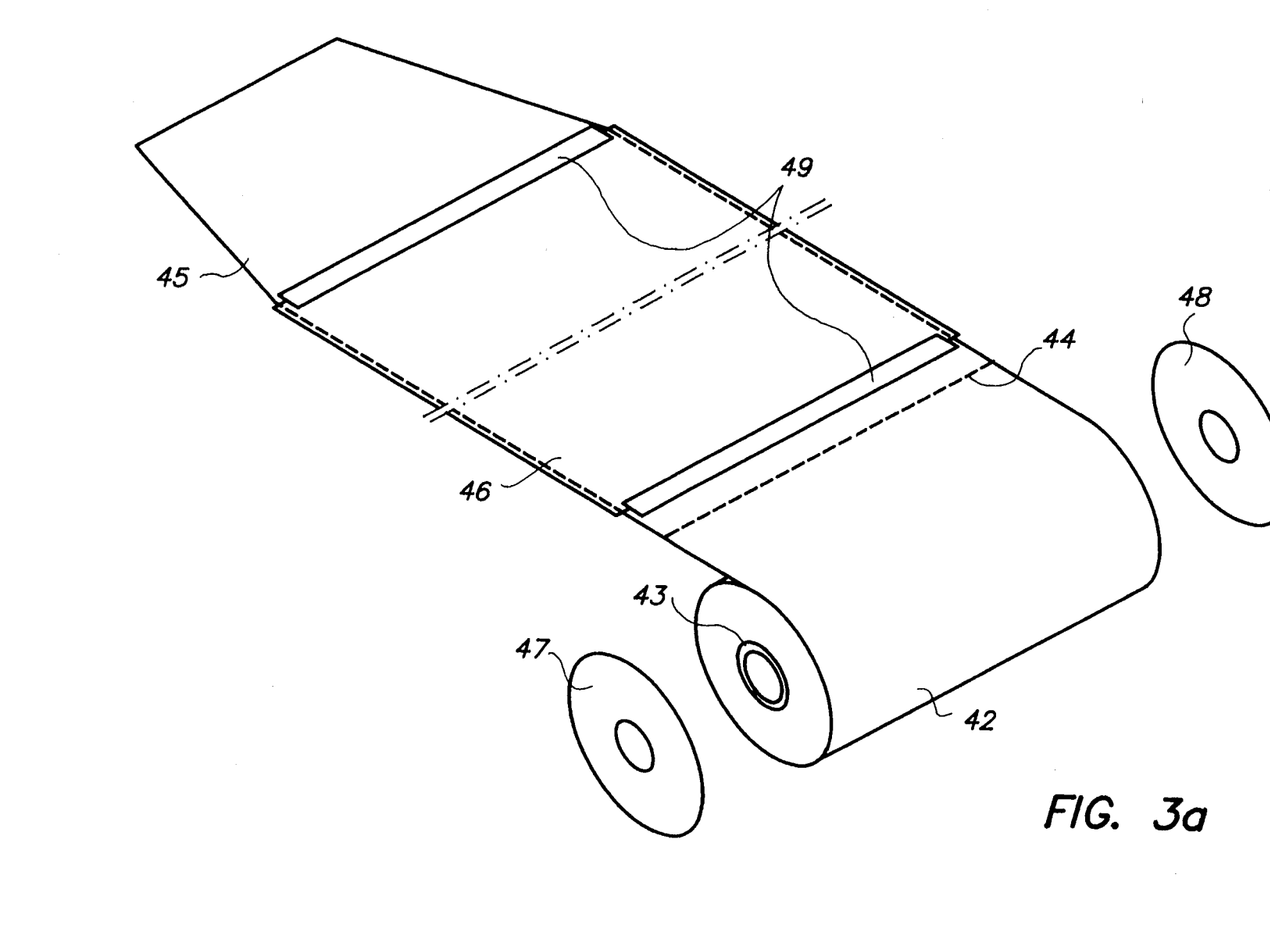
FIG. 3a is an exploded view of a roll of photographic film which is lighttightly wrapped in a daylight-loading wrapper for loading in the cassette of FIG. 1.

Roll 21 to be loaded in the cassette of FIG. 2 is illustrated in detail in the exploded view of FIG. 3 and consists of light-sensitive film 42 wound on a cardboard supporting core 43, a leader 45, a wrapping sheet 46 forming a circumferential wrapping portion extending over about 450° to 540° around the roll and slightly wider than the film width, and two annular end wrapping covers 47 and 48 sealed at their inner opening to the ends of core 43 and at their peripheral rims to the corresponding rims of sheet 46 to form a lighttight wrapper for roll 42. Self-adhesive tapes 49 keep sheet 46 in position on leader 45 prior to its sealing to the end portions. The described daylight loading film wrapping is disclosed in detail in U.S. Pat. No. 4,733,777 mentioned hereinbefore.

For the loading of the roll, two rigid supporting flanges 50 and 51 having a central hub, such as hub 52 illustrated for flange 50 in FIG. 1, are inserted with their hubs in the open ends of the supporting core 43 of the roll, and then the roll is put in the base of the opened cassette, the position of leader 45 being as illustrated in FIG. 1. Lid 24 is closed, the locks 53 and 54 are locked, and leader 45 is pulled to unroll the film roll. During the first unwinding, the seals between the wrapping sheet 46 and the end portions 47 and 48 are progressively broken, and the operator continues pulling until wrapping foil 46 has become completely clear of the cassette. He can then either remove sheet 46 together with the self-adhesive tapes 49 from leader 45, or he can cut off the extending portion according to a line as indicated by 44. The cassette is then ready for use. It should be understood that leader 45 may be the leading end portion of the film roll cut to have a tapered form as shown, but said leader can as well be a separate strip of sufficiently strong foil that has been sealed to the end of the roll of film.

Figure 3B:
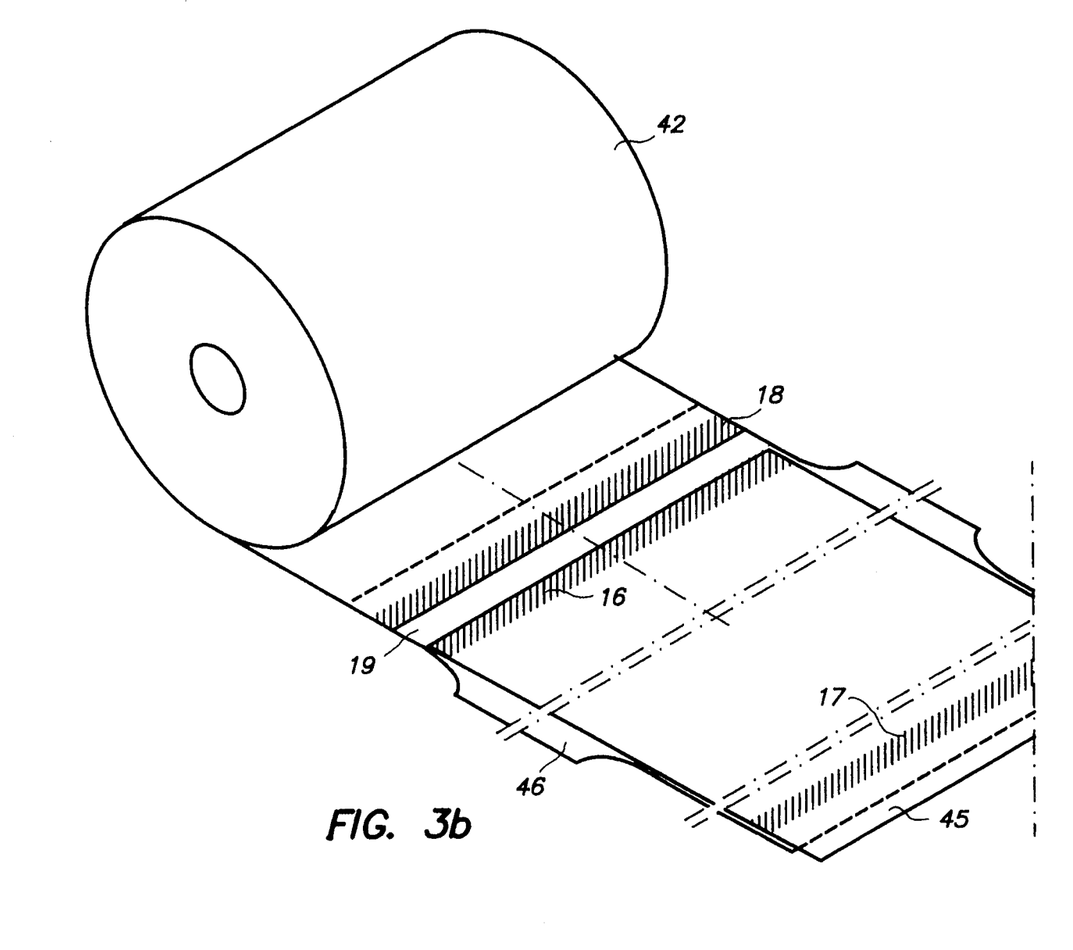
FIG. 3b shows a view of another embodiment of a film roll for daylight loading.

An alternative form of daylight loading film roll is shown in FIG. 3b, in which a leader 45 is adhered to a lighttight wrapping sheet 46 on transverse zones 16 and 17, the wrapping sheet being wider than the leaderer as shown, and the end portion of the wrapping sheet is on its turn peelably attached to the film at zone 18, thereby leaving a strip 19 of wrapping material that freely bridges the corresponding edges of film and leader.

The cassette is now described in detail with reference to FIGS. 4 to 11.

Figure 5:
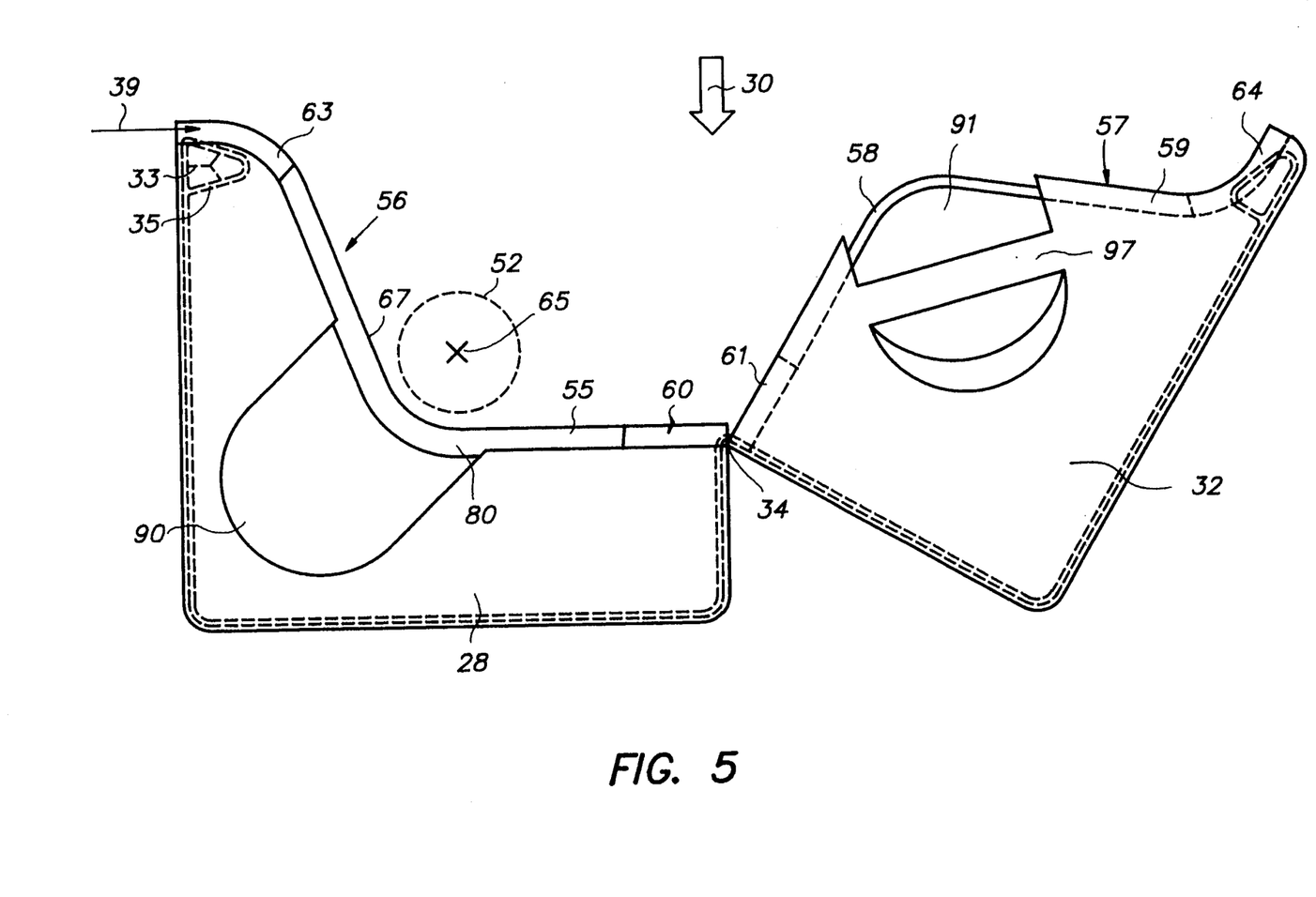
FIG. 5 is a front elevation of one side cap of the cassette according to FIG. 1 in opened position.

FIG. 4 is a front elevation of side cap 30 in the closed position of the cassette, whereas FIG. 5 shows this side cap in the open position of the cassette. The side cap is composed of two separate parts 28 and 32, which in the closed position determine a square cross sectional shape. The lock for locking both parts together has not been illustrated in these figures but will be described later. Housing 26 is shown in broken lines.

The edges 56 and 57 (see FIG. 5), of both parts of the side cap that co-operate with each other and that run from the position of the dispenser slot 39 towards that of the hinge 34 of the housing have complementary curved shapes as shown. At said edges the two cap parts have lips 55, 58 and 59 that overlap each other to constitute a lighttight labyrinth. Co-operation of said lips is illustrated at three positions along the edges 56 and 57 by the respective cross-sections in FIGS. 6, 7 and 15 which are taken on lines 6—6, 7—7 and 15—15 of FIG. 4.

Figure 6:
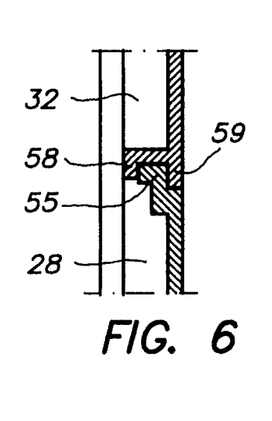
FIG. 6 is a section on line 6—6 of FIG. 4.

The enlarged sectional view of FIG. 6 shows that lip 55 of part 28 of the side cap co-operates with lips 58 and 59 of part 32.

Figure 15:
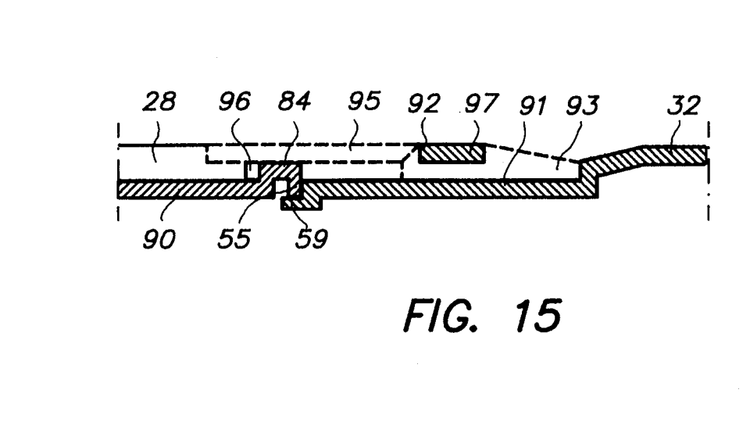
FIG. 15 is a partial section on line 15—15 of FIG. 4, FIGS. 16a, b and c are enlarged illustrations of the encircled section 16 of FIG. 8 for different positions of the lid of the cassette.

FIG. 15 shows that at the locking area of the side cap lip 55 co-operates only with lip 59 of part 32. Yet the lighttightness at this place is satisfactory since in fact there is formed an other co-operating lip which is constituted by portion 95 of the lock 54 (which is shown in broken lines but which will be described in detail hereinafter) and which overlies lip 55 at the central section of lip that 59 that is interrupted. The lighttightness is additionally ensured by the equally black pigmented supporting flanges 50 and 51 that lie close to the inside surface of the side caps, and by the annular wrapping portions 47 and 48 of the lighttight wrapper of the film roll.

Figure 7:
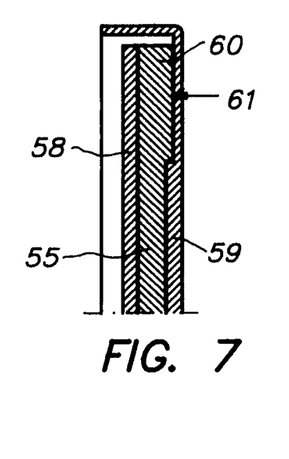
FIG. 7 is a section on line 7—7 of FIG. 4.

The enlarged sectional view of FIG. 7 is a longitudinal cross-section of the interengaging lips 55, 58 and 59. It may be seen that lip 55 ends in a shoulder 60 of slightly increased thickness, which co-operates with a corresponding recess 61 in the end section of lip 59 to constitute a light-lock for light that should endeavour to enter the cassette in the direction as indicated by the arrow 62 (see FIG. 4). A similar longitudinal light-lock, i.e. lengthwise of the lips, is provided at the opposite end of the lips, namely by step 63 co-operating with a corresponding recess 64 in lip 59 (see FIG. 5).

Another function of steps 60 and 63 co-operating with recesses 61 and 64 is to provide a lock or latch for both parts of the side cap against relative displacement in the direction indicated by arrow 15 in FIG. 4. It should be understood that the lid and the base of a closed cassette are held together in fact only by the flexible hinge 34 of the housing and the locks fitting in the cavities 90 and 91. This means that wringing or twisting a side cap upon manipulation of a cassette may put a heavy strain on the lateral ends of the hinge by a relative parallel displacement of both parts of said cap. The immobilisation of both parts of a side cap by the described measures avoids such strain.

The longitudinal axis of the cassette is indicated by cross 65 in FIG. 5, and it will be appreciated that the concave curve 67 in the edge 56 of base part 28 provides ample finger space for engaging the hollow end of hub 52, shown in broken lines, of a roll supporting flange as 50, for lifting an empty core from the cassette and substituting a fresh roll of film.

Before the description of the locking of both parts of the side caps, the innerside construction of a side cap will be described on the basis of FIGS. 8 to 11, which count for side cap 29 opposite to cap 30 already described.

It is clear that both side caps are mirror images of each other.

Figure 8:
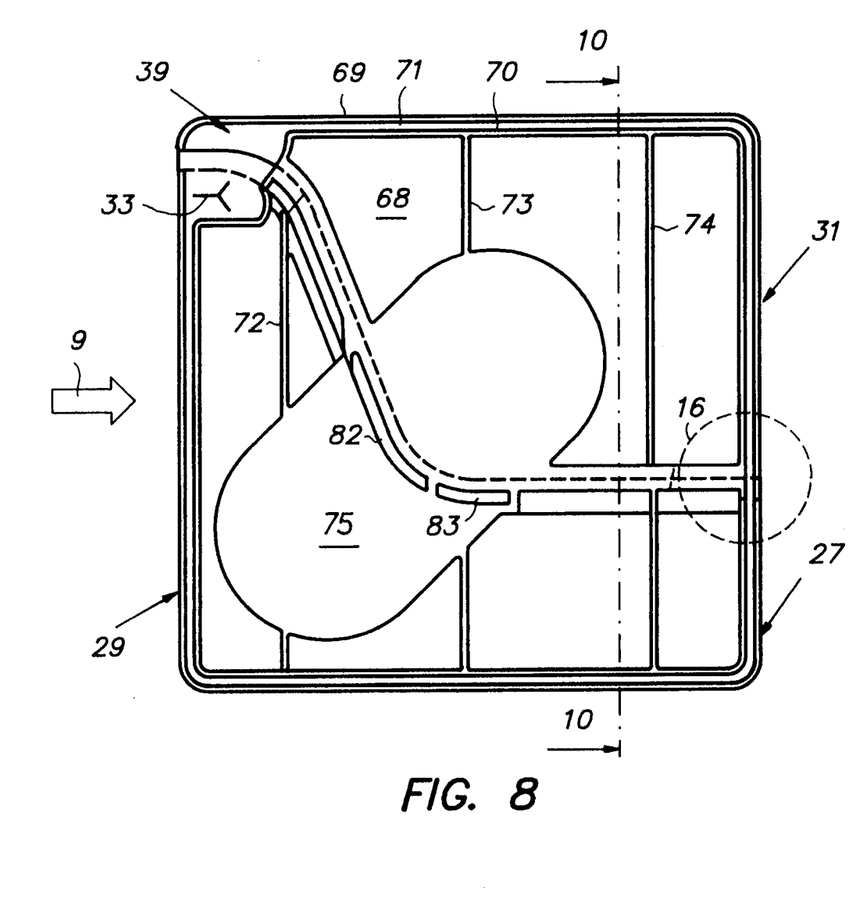
FIG. 8 is a view of the inner side of the side cap opposite to that of FIG. 5 in closed position.
Figure 9:
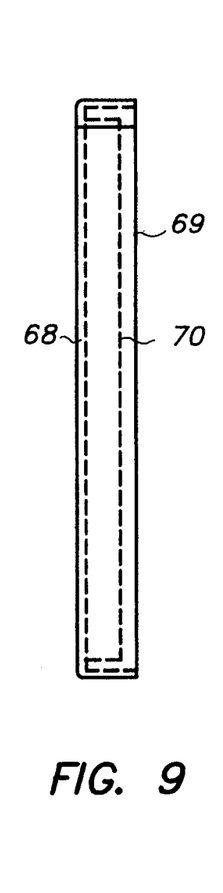
FIG. 9 is a side view of FIG. 8 according to arrow 9.

Side cap 29 comprises basically a flat wall 68, two circumferential edge rims 69 and 70 defining a perimetric channel 71, a number of parallel stiffening ribs such as 72, 73 and 74, and a recessed portion 75.

Figure 10:
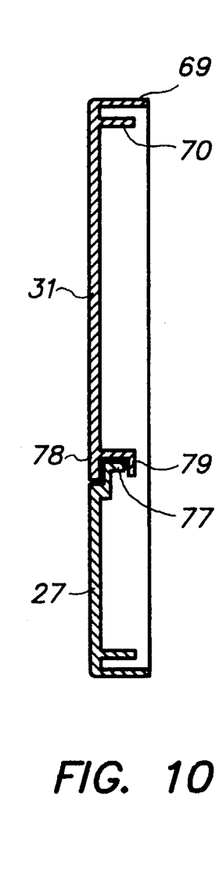
FIG. 10 is a section on line 10—10 of FIG. 8.

The cross-section of FIG. 10 shows lips 78, 79 of part 31 overlapping with lip 77 of part 27.

The recessed portion 75 of wall 68 in fact is composed of two portions 80 and 81 belonging to the respective parts 27 and 31 of the cap (see FIG. 11) which shows the position of side cap 29 in the open position of the cassette. It should be clearly understood that both parts 27 and 31 of the side cap are discrete elements, the relative position of which is determined only by that of sections 25 and 30 of housing 26, whose side edges are fixedly attached in the perimetric channels of the side caps.

Figure 11:
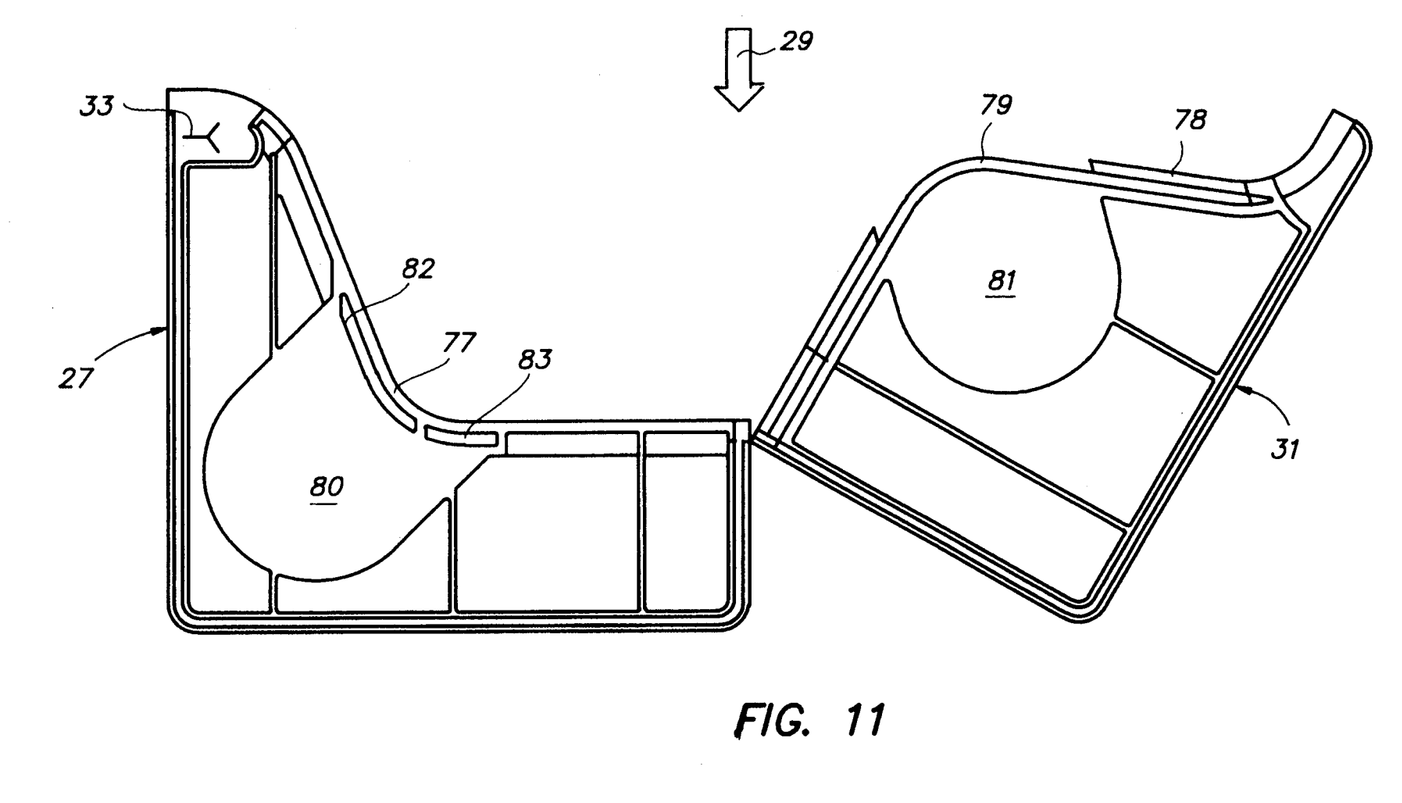
FIG. 11 is a view of the inner side of the side cap opposite to that of FIG. 5 in opened position.
Figure 12:
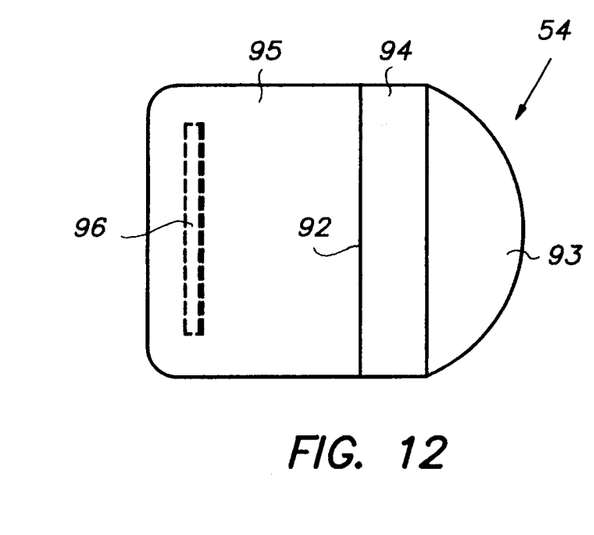
FIG. 12 is a plan view of one embodiment of a lock for the cassette according to FIG. 1.
Figure 13:
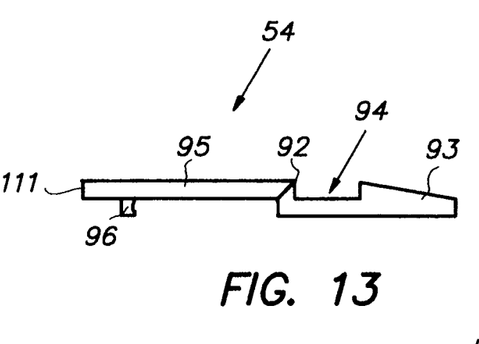
FIG. 13 is a side view of the lock of FIG. 12 in its locking.
Figure 14:
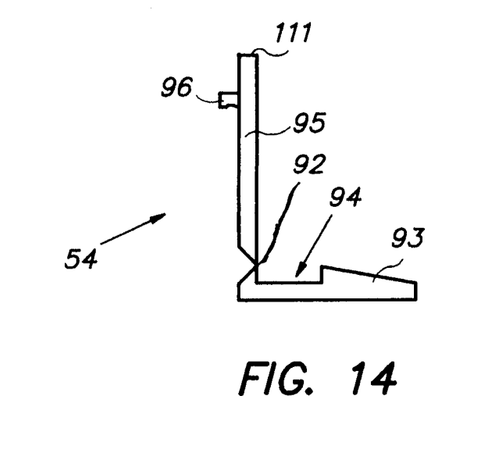
FIG. 14 is a side view of the lock of FIG. 12 in its unlocked position.

In the drawing of FIG. 11 there is no cross-sectional illustration of the housing, but the position of section 31 with respect to section 27 corresponds exactly with reality when the cassette is swung open. The hollow cavities 82 and 83 visible on FIGS. 8 and 11 are in fact the underside of the curved ledge 84 which serves for locking the cassette. The recessed portions 90 and 91 of side cap 30 of FIG. 5 correspond with portions 80 and 81 of cap 29 shown in FIG. 11.

Locking of the cassette is now described with reference to FIGS. 12 to 15, and also to FIG. 4.

Lock 54 is generally flap-like plastic component with a shape as shown and has been made by injection-moulding, with an integral hinge 92. One end 93 of the lock is rounded and has a tapering upper surface (see FIG. 13), which moreover is also convexly curved. Then comes a rectangularly recessed channel 94, and next a rectangular swingable portion 95 having at the underside a detent in the form of a slightly undercut rib 96. Lock 53 is identic to lock 54 (see FIG. 1).

Mounting of lock 54 in section 32 of side cap 30 (see FIG. 4), occurs by pushing convexly curved end 93 underneath strip 97 until strip 97 snapfits into channel 94 of the lock. Strip 97 extends over recessed portion 91 and lies flush with the wall of the side cap. This is illustrated in detail in FIG. 15, which is a section on line 15—15 of FIG. 4. Lock 54 has been illustrated in broken lines for clearness' sake, and has been put in place by inserting it in the righthand direction according to FIG. 15.

Undercut rib 96 is clamped over locking ledge 84 and keeps in that way sections 28 and 32 of side cap 30 tightly together. Lock 53 operates in the same way for cap 29.

In the closed position of the cassette, the outer surface of the swingable section 95 of the lock lies flush with the outer surface of the side cap. Swingable section 95 moreover overlays the overlapping lips 55 and 59 of the two sections of the side cap in the zone of the recessed portions 90 and 91, so that said lock section forms so to speak a third lip improving the lighttightness of co-operating lips 55 and 59, as mentioned already.

The space in cavity 90 that remains up to the end edge of the closed lock, indicated in broken lines 111 in FIG. 4, provides ample space for a fingertip to grip lock section 95 at its underside and to pull it away from the cap, thereby unlocking the cap.

Figure 16A:
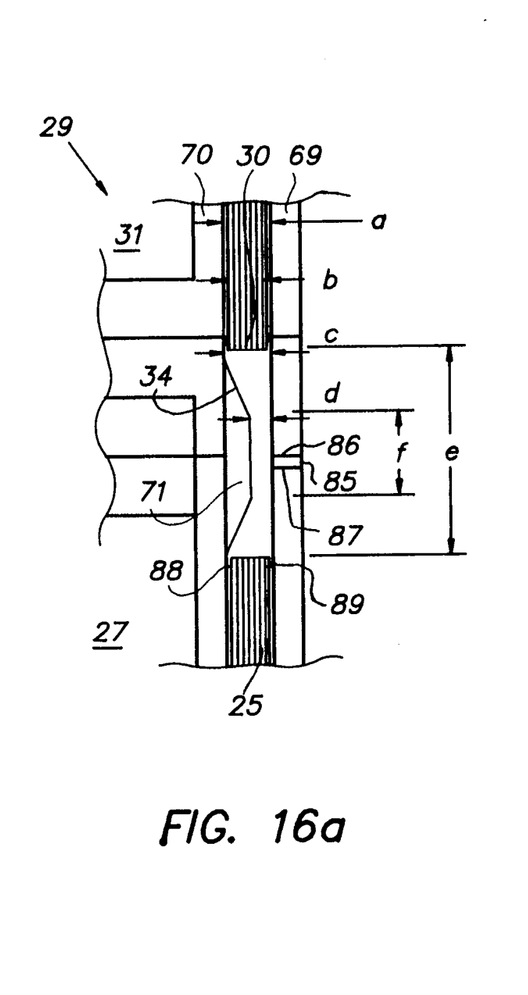
Figure 16B:
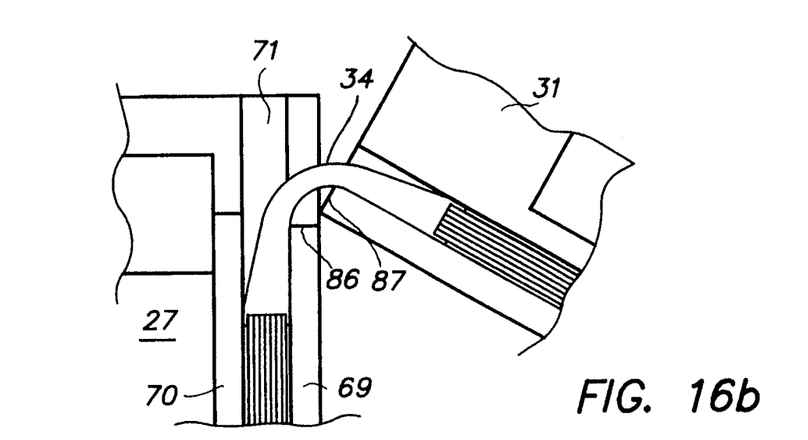
Figure 16C:
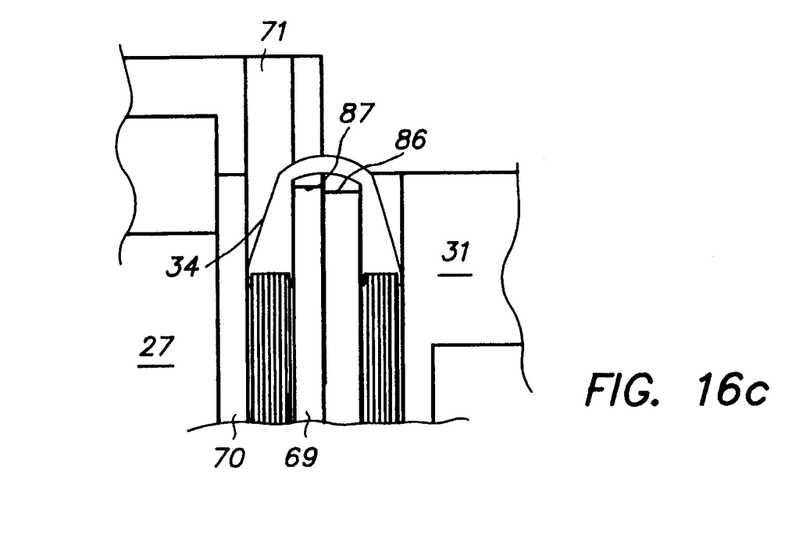

FIGS. 16a to 16c are enlarged cross-sectional drawings of the housing illustrating in detail the integrated hinge 34 of the cassette and its flexure upon opening of the cassette.

Hinge 34 interconnects wall sections 30 and 25 of the housing which fit in perimetric channel 71 determined by edge rims 69 and 70 of side cap 29, shown in FIG. 16a. It may be seen there is a spacing 85 between the extremities 86 and 87 of the outer edge rim 69 of the sections 27 and 31 of the side cap. This spacing limits the stretching of hinge 34 when the cassette is opened since it will be understood that if this spacing were zero, the point of pivotation would lie on the outside surface of edge rim 69 causing an important stretching of the hinge.

Hinge 34 has a central portion of reduced thickness, being located asymmetrically as shown. This is done to displace the zone of flexure of the hinge towards the outside surface of the cassette, i.e. towards the right-hand side of FIG. 16a whereby the inside surface of the hinge becomes less stretched when the cassette is opened than if the hinge were uniform in thickness because then its neutral plane would be located more to the left.

A further point worth mentioning is that the hinge has small lips 88, 89 on each longitudinal edge, which overlap the ends of the housing sections 25 and 30 so as to obtain a larger bonding surface between hinge and housing.

The longitudinal edges of the hinge as well as the lips forming protuberances thereon, adhere to the housing by the thermoplastic bonding obtained during the co-extrusion of these elements.

FIG. 16b shows the cassette lid opened over approximately 200 angular degrees. The shape of the hinge on the drawing is an exact reproduction of the actual shape at the angle shown. Also the relative position of the edge rim extremities 86 and 87 corresponds with reality.

FIG. 16c shows the complete opening of the cassette lid and the corresponding position of edges 86 and 87.

It will be clear that the hinge forms a critical part of the cassette since it must be capable of withstanding thousands of cassette openings and closings. An inadvertent operator can put a heavy strain on the hinge, in particular on its ends that fit in the perimetric channel of the side caps, by causing distortion or overswinging of the lid on opening the cassette.

The following data (i.e. nominal values without tolerances) illustrate the described hinge for a cassette having an outer size of 96×96 mm as mentioned already in the introduction of this specification:

a: 1.65 mm, i.e. width of the perimetric channel
b: 1.30 mm, i.e. wall thickness of the housing
c: 1.40 mm
d: 0.70 mm
e: 7.00 mm
f: 3.00 mm The present invention is not limited to the embodiment of the cassette described hereinbefore.

The locking ledge 84 which was shown as curved in FIGS. 4 and 5 can also have a more rectangular shape as illustrated by broken line 98 in FIG. 4 whereby a larger contact area is obtained between locking rib 96 and the locking ledge.

The cross-sectional shape of the cassette must not necessarily be square but can have other forms such as with a slanting corner as in U.S. Pat. No. 5,053,795 or a cross-sectional D-shape as in U.S. Pat. No. 4,956,908.

The lips of the lighttight dispenser slot must not necessarily be integral with the housing but can also be formed as separate light-locking members fitted to the slot ends of the housing. An example of suchlike construction is disclosed in U.S. Pat. No. 4,956,908.

The lips of the dispenser slot can be strongly curved in the direction of withdrawal of the film in order to improve lighttightness. An example of such an arrangement is disclosed in U.S. Pat. No. 4,889,292.

Figure 17A:
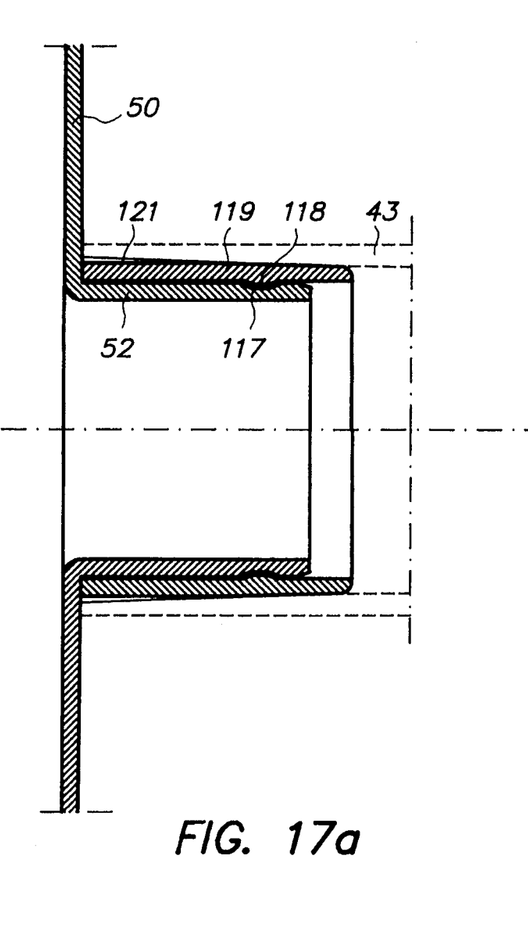
FIGS. 17a and 17b illustrate an improved rotational support for a roll core in a cassette.
Figure 17B:
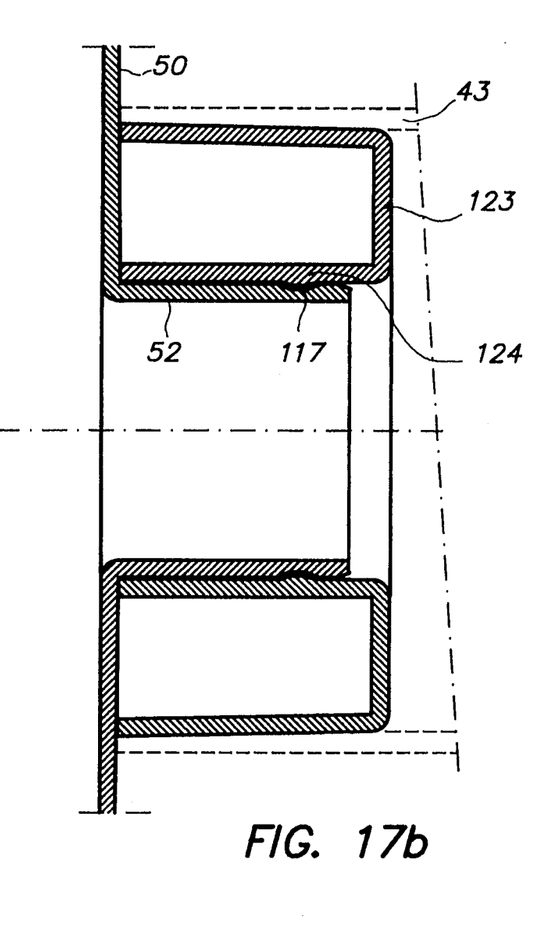

FIGS. 17a and 17b illustrate an improved rotational support for a roll in a cassette.

Referring back to FIG. 1, a cassette the photographic material of which has completely been unwound is unloaded by the operator gripping the empty core in the base and taking this core out of the cassette. Since the hubs 52 of the two supporting flanges 50 and 51 fit with some clearance in the (now empty) core, it is clear that the risk is great for one or both of the flanges to drop out of their respective core end and to roll on the desk, and so drop on the floor. The arrangement of FIGS. 17a and 17b offers a solution for this problem since it produces a rotational and axial coupling of the flanges with the core.

Referring to FIG. 17a, hub 52 of roll-supporting flange 50 is provided with a groove 117 co-operating with a ringlike projection 118 at the innerside of a sleeve 119 that fits with some clearance over hub 52 to form a rotational bearing.

Both the flange with hub 52 and sleeve 119 are made by injection-moulding from suitable plastics such as high impact polystyrene or acrylonitrile butadiene styrene. Mounting the sleeve occurs by first sliding sleeve 119 over hub 52 and then exerting sufficient axial pressure to make ring 118 finally snap in groove 117 so that the axial position of the sleeve is determined. Core 43 of a roll of light-sensitive material, usually made of cardboard or the like and illustrated in broken lines, is clampingly fitted on sleeve 119 by engagement with slanting ribs 121 of the sleeve.

The opposite side of core 43 is provided in the same way with a flange 51 (see FIG. 1) which has the same rotational coupling as flange 50. It is clear that core 43 can now be manipulated without any risk for the flanges to fall out of the core. Clampfitting of sleeve 119 into the core is sufficiently weak to enable an operator to withdraw the flange from the core without damage in view of the re-use of the flange for a next roll of light-sensitive material.

FIG. 17b shows a flange arrangement for a core 43 with a larger diameter. To that end, a sleeve 123 with a U-shaped form replaces sleeve 119 of FIG. 17a. The sleeve is provided with a ringlike projection 124 co-operating with groove 117 of hub 52. In this way one type of flange can co-operate with two different core diameters. In the present example, sleeve 119 was arranged for co-operation with a core having an inner diameter of 28.6 mm whereas sleeve 123 fitted in a 50.8 mm core.

Figure 18:
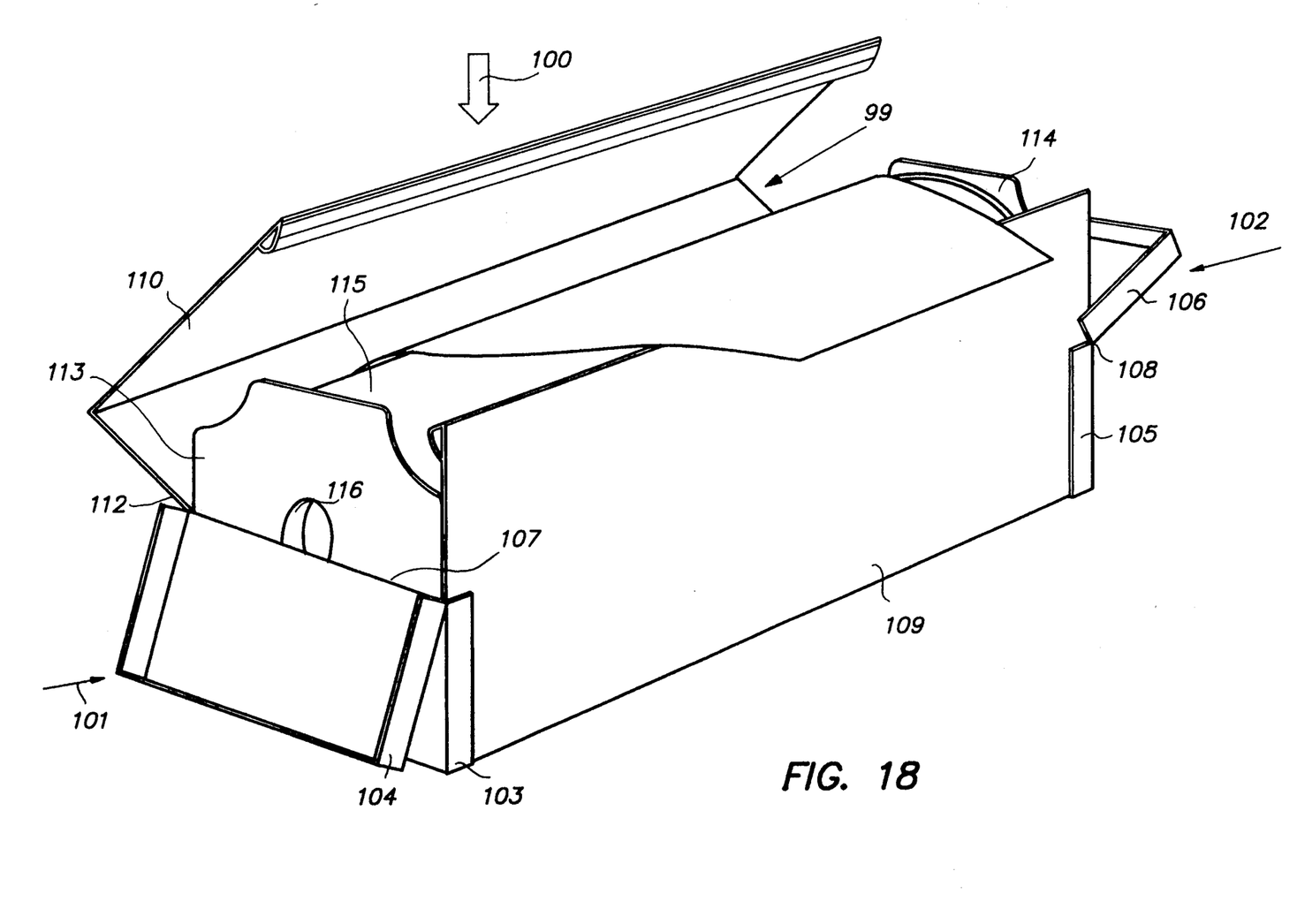
FIG. 18 is a perspective view of a partly opened cassette according to another embodiment of the invention.

FIG. 18 shows another embodiment of a reloadable lighttight cassette according to the invention.

Housing 99 of cassette 100 is as the one 26 illustrated in FIG. 2, but each of the side caps 101 and 102 now comprises two sections 103, 104 and 105, 106, connected with each other through integral hinges 107 and 108 respectively extending from one edge rim of the cap to the opposite one and being normal thereto. Sections 103 and 105 are permanently fitted to base 109 of the cassette. A suitable plastic for these side caps is polypropylene.

Opening of this embodiment of the cassette occurs by swinging cap sections 104 and 106 outwardly as shown thereby to set free lid 110 so that it can be swung open about integral hinge 112.

Closing of the cassette occurs by bringing both movable sections of the side caps in a vertical plane whereby corresponding side edges of lid 110 of the housing are engaged. The illustration of FIG. 18 is diagrammatic only and it will be understood that each side cap comprises in fact two circumferential edge rims defining a perimetric channel co-operating with the lateral side edges of the housing in a lighttight manner as described hereinbefore for cassette 20.

Locking means for locking the movable sections of the side caps are not shown in the figure but may take any suitable form.

It will be noted that the flanges 113 and 114 supporting film roll 115 have a square shape with concavely curved corners. It has been shown that this is a shape that readily lends itself to easy introduction in the opened cassette.

It should be understood that upon using either cassette 20 or 100, loading of a fresh roll of daylight-wrapped film requires taking out the supporting flanges as well as the remaining annular wrapping foils and the empty core from the cassette.

Hinges 107 and 108 of the side caps must not necessarily be located halfway the height of the cap as shown, but may be located lower or higher.

Daylight-loading film packages for use with the inventive cassette need not necessarily have a construction as described hereinbefore.

For instance, leader 45 of film roll 42 may be omitted, and its function performed by wrapping sheet 46 having sufficient mechanical strength and a tapering free end to allow unrolling of the roll by pulling said tapering end through the dispenser slot of the cassette.

Alternatively, wrapping sheet 46 may be omitted, and its function be performed by a black pigmented leader, e.g. made of polyethylene terephthalate or another plastic foil with sufficient mechanical strength, to which the annular portions 47 and 48 are lighttightly sealed.

Finally, it is clear that the use of a cassette according to the present invention is not limited to daylight loading but that the cassette may as well be loaded in a darkroom with a roll of film which is wrapped in a simple light- and moisturetight bag which is removed before loading the roll of film in the cassette.

We claim:

1. A reloadable lighttight cassette for holding a roll of light sensitive web material and dispensing it therefrom, said cassette comprising an elongated hollow open-ended housing of substantially uniform generally square cross-section throughout its length with a lengthwise slot therein for dispensing said web material therethrough and two generally square end caps fitted to margins of the open ends of the housing to close the same in a lighttight manner, each said end cap having flanges around its perimeter edges overlapping with said housing end margins, the housing being made of plastic by extrusion molding in two sections cooperating to form said square cross-section, said sections being hingedly connected together on one side of the housing by a lighttight hinge and generally opposite said hinge having longitudinal edges which meet together in lighttight relation, said hinge and meeting edges defining base and lid sections of said housing, said lid section being swingable on said hinge to open the cassette for loading of a fresh roll of light sensitive material therein, each of said caps being molded in two mating sections interconnected by a integral hinge, said hinge extending from a location on one side edge of the cap proximate to the hinge of said housing generally normally of said cap edge to the opposite side edge, one section of each end cap being fixedly attached to the base section of said housing and the other section being swingable from and to a position co-planar with the fixedly attached end cap section wherein its edge flanges overlap with the end margins of the lid section of the housing to close the cassette, to and from a position out of the plane of the fixedly attached cap section to free said housing lid section for swinging movement relative to the base section to open the cassette for reloading.

2. A reloadable lighttight cassette for holding a roll of light sensitive web material and dispensing it therefrom, said cassette comprising an elongated hollow open-ended housing of substantially uniform generally square cross-section throughout its length with a lengthwise slot therein for dispensing said web material therethrough and a generally square end cap fitted to margins of each of the opposite open ends of the housing to close the such open ends in a lighttight manner, the housing being made of plastic by extrusion molding in two sections cooperating to form said square, said sections being hingedly connected together at a location along one side of the square hollow housing by a lighttight hinge and having at a location on a side of said housing generally opposite said one side longitudinal edges which meet together in lighttight relation, each of said end caps being molded in two mating sections which abut together in lighttight relation along mating interior edges to complete a cap, said mating interior edges extending substantially between the locations of said lighttight hinge and of the meeting longitudinal edges of the housing sections, corresponding sections of said end caps being attached to a section of the housing extending therebetween for bodily movement therewith to thereby define body and lid sections of the cassette hingedly connected together by said hinge, whereby said lid section is pivotable relative to said body section in generally clam-shell fashion to allow said cassette to be opened for loading of a fresh roll of light sensitive material therein, and cooperating latching means on said body and lid sections of said cassette for keeping the loaded cassette closed.

3. A reloadable cassette according to claim 2, wherein each section of each end cap is fixedly attached in overlapping relation to end margins of the open end of a section of the housing extending between said end cap section and the corresponding end cap section at the opposite housing end.

4. A reloadable cassette according to claim 2, wherein the mating interior edges of said two sections of each end cap abut each other along a curved line.

5. A reloadable cassette according to claim 4, wherein the meeting longitudinal edges of said housing sections meet adjacent a corner of said housing and define therebetween said lengthwise slot for dispensing said material, said longitudinal edges being provided with yieldable material to lighttightly close said slot while permitting said web material to pass therethrough, and said curved line extends from the position of the lighttight hinge of the housing to a position proximate to said lengthwise slot.

6. A reloadable cassette according to claim 5, wherein said curved line has a substantially ogee configuration and a portion of said curved line extends on the side of the longitudinal axis of the cassette in the direction of the body section of the cassette.

7. A reloadable cassette according to claim 2, wherein said latching means comprises a plastic flap with two sections interconnected by an integral hinge, one flap section being attached to one section of each end cap, the other flap section being arranged for outward swinging and having a detent arranged for cooperation with a locking ledge in the other section of each end cap.

8. A reloadable cassette according to claim 7, wherein the flap extends generally diagonally with respect to opposite corners of the respective sections of each end cap.

9. A reloadable cassette according to claim 2, wherein the housing sections are molded from a mixture of high impact polystyrene and a block copolymer of styrene and butadiene.

10. A Reloadable cassette according to claim 2, wherein the hinge is co-extruded with the housing sections from a copolymer of ethylene and an acrylic ester.

11. A reloadable cassette according to claim 2, wherein said mating interior edges of said sections of each said end cap abut in overlapping relation to form a labyrinth lighttight seal therebetween.

12. A reloadable cassette according to claim 2, wherein said lighttight hinge has the form of a longitudinal strip bonded along side edges to adjacent longitudinal edges of said housing sections, said strip being asymmetrical in cross section with a central portion of reduced thickness compared to the thickness of its side edges bonded to said section edges.

13. A reloadable cassette according to claim 12, wherein the longitudinal hinge strip has lips projecting from opposite surfaces of its side edges in overlapping relation with margins of said adjacent housing section edges to increase the bonding strength therebetween.

14. A reloadable cassette according to claim 2, wherein said roll of light sensitive material has a hollow central core and which further comprises removable end flanges for the ends of said roll, said end flanges each carrying a central hub for insertion in said roll core to rotatably support the roll in said cassette.

15. A reloadable cassette according to claim 14, including a sleeve adapted to be fitted on each said hub, said sleeve being of varying diameter to adapt the hub to roll cores of different diameter.

16. A reloadable cassette according to claim 15, wherein each said sleeve and hub have cooperating detent means for determining the axial position of the sleeve on the hub.

* * * * *